Jan. 19, 1971     W. E. GAUTSCHE, JR     3,555,717

ARTIFICIAL FISHING LURE

Filed Oct. 24, 1968

INVENTOR.

William E. Gautsche, Jr.

BY Harness, Dickey & Pierce

ATTORNEYS.

United States Patent Office 3,555,717
Patented Jan. 19, 1971

3,555,717
ARTIFICIAL FISHING LURE
William E. Gautsche, Jr., Dowagiac, Mich., assignor to Victor Comptometer Corporation, Chicago, Ill., a corporation of Illinois
Filed Oct. 24, 1968, Ser. No. 770,269
Int. Cl. A01k 85/00
U.S. Cl. 43—42.17        2 Claims

ABSTRACT OF THE DISCLOSURE

An artificial fishing lure comprising an elongated, substantially rigid body member having eyelet means at both ends thereof with a fishhook secured to one eyelet and a line secured to the other eyelet. A first weight means is secured to the body means adjacent to the fishhook eyelet and a bucktail extends rearwardly to substantially surround the fishhook and first weight means. A spinner is mounted on the body member intermediate the length thereof for longitudinal sliding movement against a stop means on the body member. A second weight means comprising spaced portions is disposed on opposite sides of the spinner with beads located on opposite sides of the second weight portions. The first and second weight means are about equal in weight to longitudinally balance the body member. The line eyelet is offset from the axis of the body member to prevent torque produced upon rotation of the spinner from twisting the line.

BACKGROUND OF THE INVENTION

The present invention is directed for a new and improved artificial fishing lure which is provided with what is commonly known as a bucktail comprising a multiplicity of hair-like elements which extend rearwardly from a central portion thereof and are adapted to substantially cover or enclose the associated fishhook. The lure is provided with a rotatable spinner which may be and preferably is of a reflective character, as well as with a plurality of colored beads which are adapted to cooperate with the spinner in attracting the attention of fish in the vicinity of the lure. In accordance with the present invention, the lure is provided with a plurality of weight means which are spaced longitudinally therealong and function to maintain the lure in balance a sit is being pulled through the water, thereby assuring that the lure remains substantially level or horizontal. In accordance with further principles of the present invention, the lure is provided with an offset hitch arrangement which enables the associated fishing line to be secured to the lure at a position offset from the longitudinal axis of the lure, whereby the torque produced by the spinner as the lure is pulled through the water is not transmitted to the fishing line, thus preventing objectionable twisting of the fishing lure during trolling or retrieving of the lure.

SUMMARY OF THE INVENTION

This invention relates generally to fishing lures and, more particularly, to a new and improved bucktail type fishing lure.

It is accordingly a general object of the present invention to provide a new and improved fishing lure.

It is a more particular object of the present invention to provide a new and improved fishing lure which exhibits improved balanced characteristics so as to remain in a generally level or horizontal attitude as it is pulled through the water.

It is another object of the present invention to provide a new and improved fishing lure comprising a rotatable spinner and hitch means adapted to be secured to the associated fishing line in a manner so as to prevent the torque produced upon rotation of the lure spinner from being transmitted to the fishing line.

It is a further object of the present invention to provide a new and improved fishing lure of the above character which permits rapid changing of the associated fishhook so as to adapt the lure for different size fish and replacement of the fishhooks in the event they become damaged.

It is another object of the present invention to provide a new and improved fishing lure of the above character which is of an extremely simple design, is easy to assemble and economical to commercially manufacture.

Other objects and advantages will become apparent from the following detailed description, taken in conjunction with the accompanying drawing.

DETAILED DESCRIPTION OF THE PREFERRED EMBODIMENT

Figure 1:
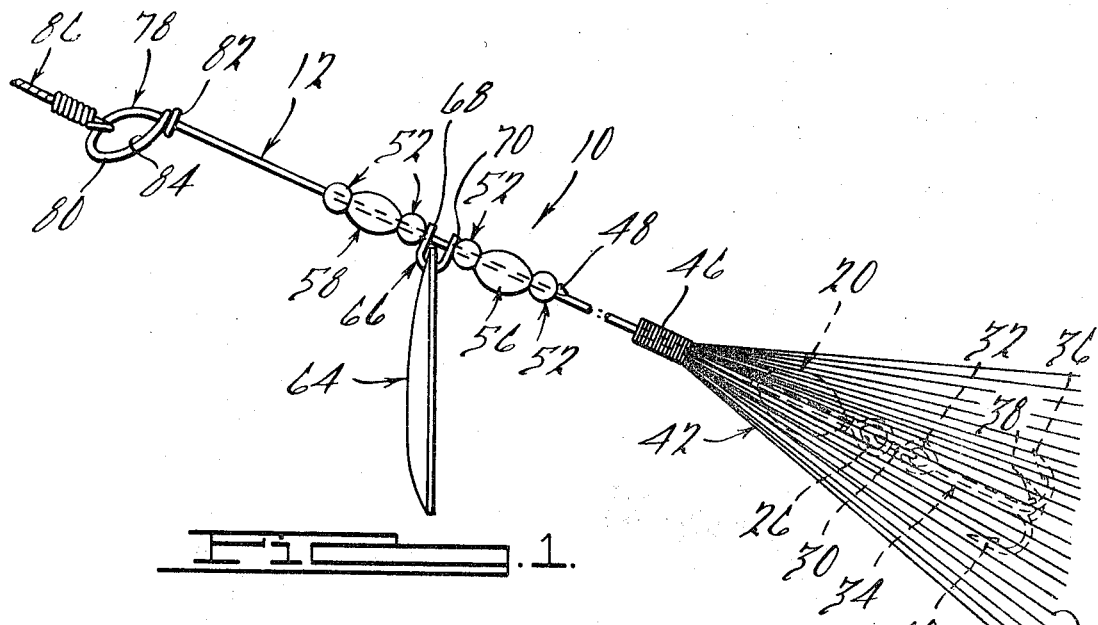
FIG. 1 is a side elevational view of the new and improved artificial fishing lure embodying the principles of the present invention.
Figure 2:
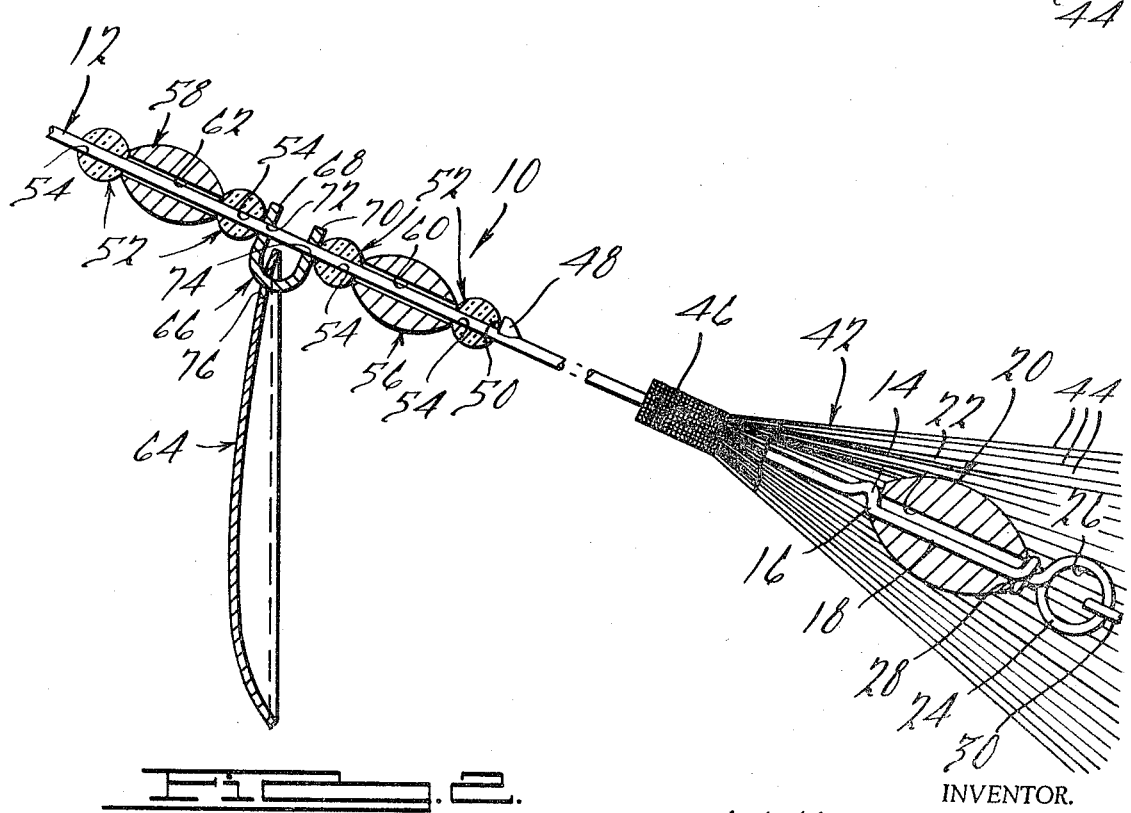
FIG. 2 is an enlarged side elevational view, partially broken away, of the fishing lure illustrated in FIG. 1.

For purposes of description, the terms "inwardly," "outwardly" and the derivatives thereof will have reference to the geometric center of the fishing lure of the present invention and the various component parts thereof. Similarly, the terms "forwardly" and "rearwardly" will have reference to the fishing lure as illustrated in FIGS. 1 and 2, with the forward end of said lure being located at the left side of these figures.

Referring now to the drawing, an artificial fishing lure 10, in accordance with the preferred embodiment of the present invention, is shown as comprising an elongated, substantially rigid body member 12 which is preferably fabricated of a heavy gauge wire or similar workstock. The body member 12 is of a substantially straight or linear configuration, with the exception of a pair of right-angle bends 14 and 16 that are formed adjacent the rearward end thereof and define a longitudinal body section 18. The body section 18 is adapted to support a generally ellipsoid-shaped weight 20 having a central, longitudinally-extending bore 22 formed therein and through which the body section 18 extends, as best seen in FIG. 2. The weight 20 is retained on the body section 18 by means of a reversely-bent or turned section 24 on the rearward-most end of the body member 12 which defines a generally circular-shaped eyelet 26 and is wound around the body section 18 to provide a generally radial face 28 against which the rearward end of the weight 20 is adapted to abut.

The eyelet 26 is adapted to have a split ring 30, preferably consisting of approximately two convolutions, extending therethrough the ring 30 also extending through an eye section 32 of a conventional fishhook 34 which is provided with a plurality, preferably three, of barbed ends 36, 38 and 40, whereby the hook 34 is detachably secured to the rearward end of the body member 12. It will be seen that by virtue of the fact that the fishhook 34 is secured to the body member 12 by means of the split ring 30, the hook 34 may easily be removed and replaced in the event it becomes damaged, or in the event it is desired to change the size of the hook 34 to accommodate different fishing conditions.

The lure 10 includes what is commonly known as a bucktail, generally designated 42, which comprises a multiplicity of rearwardly-diverging hair-like elements or strands 44 that may be of any suitable color and are secured at the forward ends thereof to the body member 12 at a position forwardly of the weight 20. The elements 44 may be secured to the body member 12 by any suitable means, such as, for example, a thin wire or similar material wrapped around the forward ends of the element 44, as seen at 46. It will be noted that the length of the bucktail 42 is such that the rearward ends of the elements 44 extend rearwardly beyond the rearward extremity of the fishhook 34, whereby the fishhook 34 is disposed substantially within the bucktail 42 in a manner such that the elements 44 will tend to hold the fishhook 34 in an extended position when the lure 10 is being cast.

The body member 12 is provided with a radially outwardly projecting lug or stop section 48 located forwardly of the bucktail 42 and defining an abutting face 50. The face 50 is adapted to preclude rearward movement of two longitudinally spaced pairs of beads, generally designated 52, that have central bores 54 formed therein and through which the forward end of the body member 12 is slidably received. The beads 52 may be fabricated of any suitable material, such as plastic or the like, and may be of any suitable color commensurate with the type of fishing with which the lure 10 is to be employed. By way of example, the beads 52 may be fabricated of a fluorescent colored plastic, which may be observed at great distances under water.

As illustrated in FIG. 2, disposed between the rearwardmost and forwardmost pairs of beads 52 is a pair of generally ellipsoid-shaped weights 56 and 58, respectively, that are formed with central, longitudinally-extending bores 60 and 62 through which the forwardmost end of the body member 12 extends, whereby the weights 56, 58 are slidable longitudinally of the body member 12 along with the beads 52. In a preferred construction of the present invention, the mass of the weights 56, 58 is substantially equal to the mass of the weight 20, with the result that the weights 56, 58 function to balance the lure 10 against the weight 20 so that the lure 10 will assume a generally level or horizontal attitude as the same as being pulled through the water. It will be apparent, of course, that the size of the weights 20, 56 or 58 may be varied somewhat to increase or decrease the weight at either the forward or rearward end of the lure 10 and thereby control the attitude of the lure 10 during trolling or retrieving thereof.

The fishing lure 10 of the present invention is provided with a spinner, generally designated 64, which is adapted to be rotatably secured to the body member 12 at a position interjacent the forward and rearwardmost pairs of beads 52, i.e., between the weights 56, 58, by means of a suitable bail or clevis member 66. It will be seen that the bail 66 is of a generally U-shaped configuration and comprises a pair of spaced parallel leg sections 68 and 70 which are formed with suitable aligned apertures 72 and 74, respectively, through which the body member 12 extends, with the central portion of the bail 66 extending through a suitable opening 76 formed in the end of the spinner 64 adjacent the body member 12, resulting in the spinner 64 being rotatable about the longitudinal axis of the body member 12, as well as being longitudinally slidable therealong.

As illustrated in FIG. 1, the forwardmost end of the fishing lure 10 of the present invention is provided with a hitch section, generally designated 78, that comprises the forwardmost end portion of the body member 12 being reversely bent, as seen at 80, and thereafter being wound or wrapped around the main portion of the body member 12, as seen at 82. The hitch section 78 defines an eyelet or loop 84 which is adapted to have one end of an associated fishing line or leader, representatively designated by the numeral 86, extend therethrough and be fixedly secured thereto in any conventional manner. It will be seen that the eyelet 84 is offset from the longitudinal axis of the body member 12, with the result that the fishing line 86 is secured to the lure 10 at a position laterally or radially outwardly from the axis of the body member 12. It has been found that through the provision of such an "offset" hitch arrangement, the torque that is produced by the rotation of the spinner 64 as the lure 10 is pulled through the water, is not transmitted to the fishing line 86, thereby preventing the line 86 from becoming twisted or tangled.

In operation, it will be seen that the fishing lure 10 of the present invention may be readily cast due to the fact that the body member 12 thereof is rigid, rather than being jointed as in conventional lures, so that the fishhook 34 cannot become tangled with any portion of the lure 10 located forwardly thereof. The rigidity of the body member 12 will permit the lure 10 to be cast similar to a plug, and the bucktail 42 will tend to hold the fishhook 34 in an extended position while casting. In retrieving the lure 10 after casting, the spinner 64 will revolve freely about the longitudinal axis of the body member 12 as the lure is drawn through the water, and the long, straight line construction of the lure enables it to be retrieved or drawn through the water more freely, with the hair-like elements 44 streaming rearwardly to cover the fishhook 34. By virtue of the provision of the weight 20 at the rearward end of the body member 12 and the pair of weights 56, 58 at the forward end of the body member 12, the lure 10 will be balanced as it is drawn through the water, and will thus assume a horizontal or level attitude. By virtue of the provision of the offset hitch 78, the torque which is produced upon rotation of the spinner 64, will not be transmitted to the fishing line 86 and hence the line 86 will not tend to become twisted or in any other way entangled, as previously described. With the spinner 64 thus revolving as the lure 10 is drawn through the water, the lure 10 will wiggle in a very realistic manner, thereby simulating a live fish bait. The fishhook 34 will have a tendency to drop to the bottom or one side of the bucktail 42 so that when a fish strikes the bucktail, the hook 34 will readily set itself into the bottom or one side of the mouth of the fish, making it substantially impossible for a fish to strike the bucktail 42 without one of the barbed ends 36, 38, or 40 becoming set in the fish's mouth and substantially preventing a fish from grabbing the bucktail and thereafter pulling it from his mouth.

It will be seen from the foregoing description that the present invention provides a new and improved fishing lure which is of an extremely simple design, is easy to assemble and economical to commercially manufacture. Moreover, the fishing lure 10 of the present invention will be extremely easy to use and will prevent the associated fishing line from becoming entangled during trolling or retrieving thereof. By virtue of the provision of the split ring 30, the fishhook 34 may be easily replaced when damaged or when it is desired to change the fishing hook size, without disturbing or otherwise disassembling the lure 10.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:
1. In an artificial fishing lure,
   an elongated, substantially rigid body member having eyelet defining means adjacent the rearward end thereof,
   a hook secured to said eyelet defining means and extending rearwardly of said body member,
   a bucktail secured to said body member at a position intermediate the opposite ends thereof,
   said bucktail comprising a multiplicity of hair-like elements having the forward ends thereof secured to said body member and the rearward ends thereof extending rearwardly of said body member,
   the length of said hook being less than the length of the portion of said bucktail extending rearwardly of said body member, whereby said hook is located substantially within said bucktail, a stop affixed to said body member at a position forwardly of said bucktail, a rotatable spinner secured to said body member for longitudinally sliding movement, a first weight having a central longitudinally extending bore through which said body extends at a position interjacent said eyelet defining means and the forward ends of said hair-like elements, whereby said first weight is located entirely within said bucktail, a second weight comprising first and second portions secured to said body member at the opposite sides of said spinner, in order to stabilize said body member upon rotation of said spinner, the sum of the weight of said first and second portions of said second weight being substantially equal to the weight of said first weight, whereby to longitudinally balance said body member, a plurality of beads loosely secured to said body member at positions forwardly and rearwardly of said first and second portions of said second weight means, and hitch means comprising a reversely bent portion of the forward end of said body member defining an eyelet offset from the rotational axis of said spinner and adapted to have one end of a fishing line attached thereto, whereby said fishing line and the longitudinal axis of said body member are offset with respect to one another to prevent the torque produced upon rotation of said spinner as the lure is pulled through the water from twisting said fishing line.

2. An artificial fishing lure as defined in claim 1 wherein said first and second portions of said second weight means are generally ellipsoid-shaped and loosely secured to said body member, one interjacent said spinner and said stop and the other interjacent said spinner and said hitch means.

References Cited

UNITED STATES PATENTS

| | | | |
|---|---|---|---|
| 1,395,533 | 11/1921 | Tuttle | 43—42.28 |
| 2,162,966 | 6/1939 | Ozburn | 43—42.39X |
| 2,206,274 | 7/1940 | Wiberg | 43—42.19X |
| 2,323,096 | 6/1943 | McDowell | 43—42.17 |
| 2,610,429 | 9/1952 | Thomas | 43—42.17 |

SAMUEL KOREN, Primary Examiner

D. J. LEACH, Assistant Examiner

U.S. Cl. X.R.

43—17.5, 42.19, 42.28, 42.39, 43.13